United States Patent

[11] 3,588,698

[72] Inventor Joel N. Ashcraft
Columbus, Miss.
[21] Appl. No. 788,451
[22] Filed Jan. 2, 1969
[45] Patented June 28, 1971
[73] Assignee AMBAC Industries, Incorporated
Columbus, Miss.

[54] ELECTRONIC TACHOMETER
3 Claims, 1 Drawing Fig.
[52] U.S. Cl. .................................................. 324/169,
324/78, 307/233
[51] Int. Cl. ........................................................ G01p 3/48
[50] Field of Search........................................... 324/78, 70;
307/271, 295, 233; 328/140, 123 (Inquired)

[56] References Cited
UNITED STATES PATENTS
3,374,431  3/1968  Westberg ..................... 324/70
3,473,119  10/1969  Mazurkevics ................ 324/70
FOREIGN PATENTS
84,645  10/1965  France ......................... 324/70

Primary Examiner—Michael J Lynch
Attorney—Howson and Howson

ABSTRACT: An electronic tachometer suitable for producing indications of engine r.p.m by connecting two leads from the tachometer across a pair of terminals (e.g. in the ignition system of the engine) between which there is generated a series of voltage pulses recurrent at a rate proportional to engine speed. A Zener-diode clamping circuit derives, from the engine-synchronized voltage pulses, a corresponding series of control pulses having predetermined fixed amplitudes and applies them to the base circuit of a transistor connected in the common-emitter circuit configuration. The emitter load for the transistor is a capacitor, which is charged to a predetermined voltage in response to each engine-synchronized pulse. Between such pulses the capacitor is discharged by way of a diode connected between the capacitor and the base of the transistor, so that the discharge path is effectively opened during charging but closed during the discharging interval. A current meter is connected in the charging path for the capacitor, and produces a needle deflection proportional to the average current through it and hence proportional to the rate of operation of the engine. To change the scale factor of the meter, one or more capacitors may be connected in parallel with the original capacitor when lower rates of engine operation are to be indicated. A rectifier in the input lead enables easy calibration by connection to a power line.

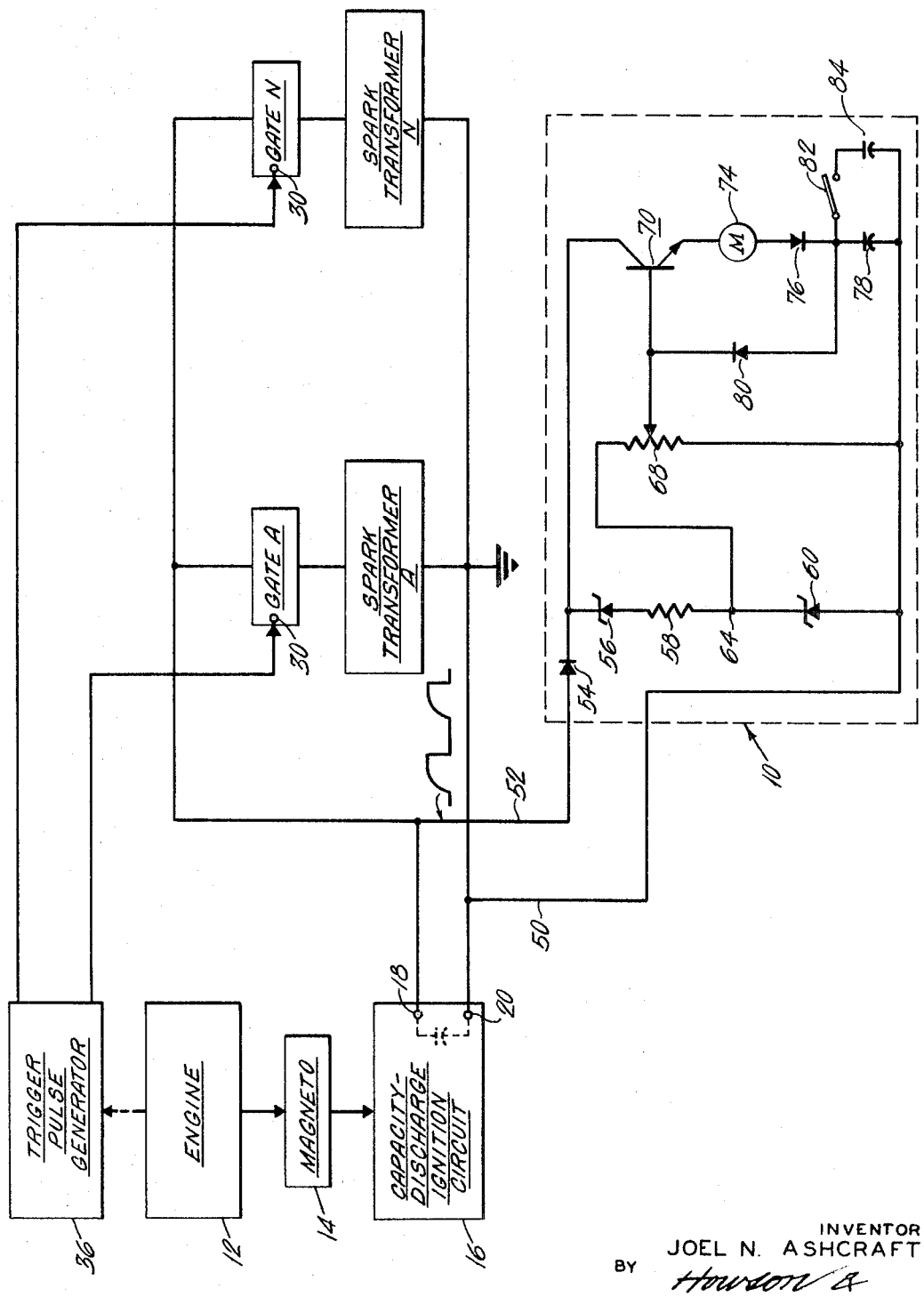

ELECTRONIC TACHOMETER

BACKGROUND OF THE INVENTION

There are many applications in which it is desired to produce indications of the rate of operation of a machine, such as an engine. For this purpose, various forms of tachometers have been proposed and developed. Conventional tachometers include mechanically driven instruments which are mechanically connected to some rotating part of the engine; such devices generally require special gearing to make the connection to the rotating engine part, and a flexible cable is usually needed to transmit the mechanical rotation from the rotatable part of the engine to the remote indicator.

In another known from of tachometer, the engine is connected to a generator which drives a small electric motor, the motor in turn being connected to the indicator; the latter type of system is quite expensive, and requires special means on the engine for driving the generator.

Besides their relative expense, complexity and difficulty of connection to an engine, the foregoing types of instruments involve mechanically rotating parts which are inherently subject to wear and to failure.

Accordingly it is an object of the present invention to provide a new and useful electronic tachometer for measuring the rate of operation of a machine.

Another object is to provide such an electronic tachometer particularly adapted for measuring the rate of operation of an engine.

A further object is to provide such an electronic tachometer requiring no mechanically moving parts, with the possible exception of the output indicator, such as a meter needle for example.

Another object is to provide such an electronic tachometer which can be readily connected to, and disconnected from, an engine.

It is also an object to provide such an electronic tachometer which is operative in connection with engine systems having no available source of DC supply voltage, and in which all of the required operating power is derived form electrical pulses synchronous with engine operation.

It is also an object of the invention to provide such an electronic tachometer in which the instrument range, or scale factor, can easily be changed by electrical switching.

A still further object of the invention is to provide such an electronic tachometer which can be easily calibrated by connection to a known fixed-frequency source of alternating current.

It is also an object to provide such apparatus which is reliable and inexpensive.

SUMMARY OF THE INVENTION

These and other objects of the invention are achieved by the provision of means for deriving pulses of constant amplitudes recurrent at a rate bearing a known relation to the rate of operation of the machine, charge storage means, means controlled by said fixed-amplitude pulses for charging said charge storage means to a predetermined fixed voltage in response to each of said pulses, means for discharging said charge storage means substantially to a predetermined fixed level between successive ones of said pulses, and current measuring means for producing indications varying in proportion to the average charging current to said charge storage means, the indications provided by said current-measuring means thereby being indicative of the rate of operation of the machine.

Preferably the device of the invention also comprises rectifying means at the input thereof, so poled as not to interfere with normal operation during rate measurement, but making it possible readily to calibrate the tachometer by connecting the input leads to an alternating input signal of known frequency, such as an ordinary power line, while adjusting a potentiometer control in the circuit until the output indication corresponds to the proper reading for known frequency of the calibrating source.

In its preferred form the circuit for producing pulses of predetermined fixed amplitude comprises a Zener-diode clamping circuit supplied with engine-synchronized pulses, a controllable proportion of the voltage across the Zener-diode circuit being selected by an adjustable potentiometer and applied to the base of a transistor connected in the common-emitter circuit configuration. The latter transistor constitutes the preferred form of device for charging, to a predetermined voltage, the charge storage means, which preferably comprises capacitive means connected as the emitter load for the transistor. The discharge circuit for the capacitive means preferably comprises a unilaterally conductive device and a resistive element, connected in a series combination in shunt with the capacitive means, the side of the unilaterally conductive device opposite the high-potential side of the capacitive means being connected to the base of the transistor in such a polarity as to be nonconductive during the charging of the capacitive means and to be highly conductive during the discharging intervals between input pulses. The preferred embodiment also employs means for switching additional capacitive elements in parallel with the charge storage device to increase the range or scale factor of the instrument. The current-measuring means is preferably a current meter connected in series in the emitter circuit of the transistor.

These and other objects and features of the invention will be more readily understood from a consideration of the following detailed description, taken in connection with the accompanying drawings, in which the FIGURE is an electrical schematic diagram, partly in block form illustrating the electronic tachometer of the generator and its manner of application in one particular case.

DETAILED DESCRIPTION

Referring now to the particular embodiment of the invention shown in the drawing by way of example only, the electronic tachometer 10 is shown within broken-line outline as it may be connected for use with an engine ignition system of the capacity-discharge type, such as that shown and claimed for example in U.S. Pat. No. 3,311,783 of L. E. Gibbs et al. for "Ignition System With Electronic Distribution and Control," issued Mar. 28, 1967. Thus there is shown an engine 12, which may for example be of the high-powered type often used in oil fields and irrigation systems, and which drives the usual magneto 14. Signals from magneto 14 are applied to a capacity-discharge ignition circuit 16 to charge a capacitor therein. In some cases circuit 16 may include a single discharge capacitor, but in other cases a plurality of such capacitors may be used. In any event, at least one of these capacitors is connected across the output terminals 18 and 20 of circuit 16. Terminal 20 may be grounded, and terminal 18 connected to one side of each of a series of normally nontransmissive gate devices, tow of which are shown as gate A and gate N. The opposite sides of each of the gates is connected to ground through a corresponding spark transformer, such as spark transformer A and spark transformer N for gates A and N, respectively. Each of the gates may, for example, comprise a silicon-controlled rectifier, and each has a control terminal such as 30 responsive to control signals applied thereto to render them transmissive. Typically, the control electrodes 30 may be the gate electrodes of silicon-controlled rectifier devices. Each of the spark transformers may be connected in known manner to a separate spark plug of the engine 12.

Accordingly, each time a control signal is applied to one of the control terminals 30, the discharge capacitor of circuit 16 which is connected between terminals 18 and 20 will be discharged through the corresponding spark transformer to produce ignition sparks at the associated spark plug of the engine. The timing of the sparks is therefore controlled by the timing of pulses applied to the control electrodes 30 from the trigger pulse generator 36. Various suitable forms for such a trigger pulse generator are known, one of which is described in the above-cited Gibbs et al. patent. Since such capacity-discharge ignition systems are well known in the art, they need not be described in detail herein. It is sufficient for the present purpose to note that the discharge capacitor in circuit 16 which is connected between terminals 18 and 20 thereof is repetitively charged and then discharged through different ones of the spark transformers, so that the voltage at output terminal 18 is in the form of a series of positive voltage pulses recurring with a repetition rate proportional to the rate of operation of the engine 12. Depending upon the gearing employed and other factors, the actual repetition rate of these pulses may be the same as the engine rate in revolutions per minute, or may be a multiple or submultiple thereof.

In use of the tachometer of the invention to measure the speed of engine 12, the two input leads 50 and 52 of electronic tachometer 10 are connected to the terminals 18 and 20 of the capacity-discharge ignition circuit 16 at which the above-described series of voltage pulses occurs. The latter pulses therefore comprise the input to the electronic tachometer.

Referring now in more detail to the construction of the representative embodiment of the tachometer itself, input lead 50 thereof is at ground potential while input lead 52 is supplied with the above-described series of recurrent positive voltage pulses. The latter pulses, being positive, pass through the calibrating rectifier 54, which may be a semiconductor diode, and which is poled so that its anode is connected to the terminal 18 of circuit 16. Between the cathode side of rectifier 54 and ground there is connected the series combination of a first Zener diode 56, a current-limiting resistor 58 and a second Zener diode 60, the Zener diodes being so poled as to be substantially nonconductive for small positive pulses at the cathode of rectifier 54, and so as to breakdown and become highly conductive when the voltage at cathode 54 rise above a predetermined threshold value characteristic of the Zener diodes employed. Zener diode 60 acts as a clamping device for maintaining the voltage at tap point 64 at a predetermined maximum value once the engine is operating at a sufficient rate to produce voltage pulses above a predetermined minimum value at terminal 18. Zener diode 56 and resistor 58 serve mainly, in this preferred embodiment, to reduce the load on the storage capacitor in circuit 18, particularly when the engine is operating at the lower speeds, so as not to interfere with the operation of the ignition system.

A variably-tapped potentiometer 68 is connected between tap point 64 and ground, the variable tap on the potentiometer 68 being directly connected to the base of a transistor 70 connected in the common-emitter circuit configuration. By adjustment of the position of the variable tap on potentiometer 68, one may controllably set the fraction of the voltage at tap point 64 which is applied to the base of transistor 70.

The collector of transistor 70 is directly connected to the cathode of rectifier 54 so as to be supplied with engine-synchronized pulses while the emitter of transistor 70 is connected to ground by way of the series combination of a current-measuring meter 74, an isolating diode 76, and a charge storage capacitor 78. Due to the inherent and well-known characteristic of common-emitter transistor stages, the capacitor 78 will charge to a state in which its upper, or high-potential, side is at substantially the same voltage as that applied to the base of transistor 70. Accordingly, each engine-synchronized pulse from terminal 18 of circuit 16 causes capacitor 78 to charge to a definite corresponding voltage in response to each input pulse, the latter voltage being adjustable by adjustment of the position of the tap on potentiometer 68.

To effect discharge of capacitor 78 between successive pulses, a diode rectifier 80, preferably of the semiconductor type, is disposed with its anode connected directly to the upper plate of capacitor 78 and its cathode connected directly to the base of transistor 70. When a positive pulse is applied to the base of transistor 70, diode 80 is nonconductive and does not affect the charging operation for capacitor 78; however, when the positive pulse at the base of transistor 70 terminates, a path is provided from the upper plate of capacitor 78, through diode 80 and the lower resistive portion of potentiometer 68, to ground, thereby providing a low-resistance discharge path for capacitor 78 such as to effect substantially complete discharging of the capacitor between successive input pulses. Since capacitor 78 is thus substantially completely discharged to ground between pulses, and is charged to a fixed voltage by each input pulse, the amount of charge flowing through meter 74 to the upper plate of capacitor 78 is the same for each pulse. Accordingly, the average current flow through meter 74 is fixed for any given rate of recurrence of input pulses, but varies accurately and substantially linearly in proportion to the rate of recurrence of such pulses.

The diode 76 permits the necessary current flow for charging the capacitor 78, but prevents application of an excessive reverse voltage to the transistor emitter contact when the input pulse at the base of transistor 70 terminates; it also blocks any discharging of capacitor 78 by way of transistor 70.

Meter 74 may be of any well-known type which produces a needle deflection proportional to the average current through it, and accordingly, the needle deflection will be proportional to the rate of recurrence of input pulses to the electronic tachometer and to the rate of engine operation, as desired. The scale of the meter may readily be calibrated in terms of revolutions per minute of the engine by knowledge of the multiple which relates the input voltage pulses to the engine rate in the particular engine system to which the tachometer is connected. In addition, the scale factor of the system can be changed by means of a manually operable switch 82 which is actuatable to a closed position to connect one or more additional capacitors, such as capacitor 84, in parallel with capacitor 78. If capacitor 84 is of the same value as capacitor 78, it will require twice as much charge to bring the two capacitors to their fully charged state, so that the meter will deflect twice as far for a given repetition rate of input pulses. This makes it convenient, for example, to mark the meter face with two sets of indicia, one representing twice as many r.p.m.'s as the other, the switch 82 being manually operable to switch the meter reading so that either of the two scales is applicable during a given measurement.

For fine calibration of the meter 74, the leads 50 and 52 may be disconnected from terminals 18 and 20 and connected to a standard source of alternating voltage of known frequency, such as a 60 cycle line, for example. Rectifier 54 will protect the circuit from negative half-cycles of the reference voltage and select only the positive half-cycles of the input wave, which will then be applied as clamped positive pulses of predetermined maximum amplitude to the base of transistor 70, and will produce a corresponding deflection of the needle of meter 74. If, for example, it is known that the source operates at 60 cycles per second, the tap of potentiometer 68 may be manually adjusted so that the meter needle is at the deflected position which is proper when 3600 pulses per minute are being applied to the tachometer.

There has therefore been provided an electronic tachometer which provides direct-reading output measurements of the rate of operation of a machine such as the engine 12. It involves no mechanically moving parts, other than the needle of meter 74, and hence is not subject to mechanical wear. It is very easily used, since the leads 50 and 52 may be relatively long and provided with appropriate connectors, and all that is required is to connect these connectors to points in the engine ignition circuit between which there occur positive voltage pulses recurrent in known relation to the rate of engine operation. Furthermore, the tachometer does not rely upon use of any supply voltages, such as a storage battery for example, and therefore does not need to contain a battery of its own, can be utilized in connection with engine systems in which a storage battery is not employed, and eliminates any need to make separate connections to such a battery. The scale factor of the tachometer can be readily changed by operation of the manual switch 84 to connect or disconnect additional capacitors in parallel with capacitor 78, and the tachometer can be easily calibrated by connecting its input leads 50 and 52 to a known fixed frequency source of alternating current. The system is also extremely small, simple, reliable and inexpensive to fabricate.

It is understood that the tachometer may be applied to other types of engine and machine systems where pulses recurrent at a rate proportional to the rate of operation of the machine are available. For example, it can be connected to measure the rate of generation of pulses by an alternator directly geared to an engine. The exact form of the input voltages to the tachometer is not critical, so long as the input pulses are of sufficient amplitude and of the proper polarity. Also, the circuit itself can be designed to operate on negative pulses by utilizing a PNP transistor in place of the NPN transistor 70, and by reversing the orientations of the other components of the system, for example.

As an example only, and without thereby in any way limiting the scope of the invention, the following specific example of values suitable for use in the circuit for electronic tachometer 10 is given in the interest of complete definiteness. Resistor 58 may have a value of 4,700 ohms and potentiometer 68 may have a maximum value of 20,000 ohms. Zener diodes 56 and 60 may have breakdown voltages of about 56 volts and about 20 volts, respectively. Capacitors 78 and 84 may each have a value of about 0.047 microfarad. Transistor 70 may have a type MJE 340, and rectifier diodes may each be of the type IN 4004. Suitable peak amplitudes of input pulses in this example are about 90 volts and upwards.

While the invention has been described with particular reference to specific embodiments thereof, it will be understood that it may be embodied in a large variety of forms diverse from the ones specifically shown and described without departing from the scope and spirit of the invention as defined by the appended claims.

I claim:
1. An electronic tachometer, comprising;
    a transistor device having base, emitter and collector electrodes;
    charge-storage means;
    current-measuring means responsive to pulses of current through it to produce indications of the average value of said current;
    a reference-potential line;
    means connecting said charge-storage means and said current-measuring means in series with each other between said emitter electrode and said reference-potential line;
    means for connecting between said collector electrode and said reference-potential line a source of voltage pulses having a rate of recurrence proportional to the rate of operation of a machine;
    clamping circuit means connected between said base and emitter electrodes and to said source of voltage pulses, normally to apply a cutoff voltage between said base and emitter electrodes but responsive to said voltage pulses to apply between said base and emitter electrodes corresponding voltage pulses of a predetermined polarity and fixed maximum value for rendering said transistor device conductive during each of said pulses and to charge said charge-storage means to a predetermined fixed voltage through said current-measuring means during each of said pulses;
    discharge means connected effectively in parallel with said charge-storage means and having a time-constant which, at least during the intervals between said pulses, is short compared with the durations of said intervals, thereby to discharge said charge-storage means to a substantially fixed second voltage during each of said intervals; and
    in which said discharge means comprises a unilaterally conductive device and resistive means connected in series with each other across said charge-storage means, and a direct-current connection between said base electrode and said resistive means, said unilaterally conductive device being poled so as to discharge said charge-storage means in the intervals between said pulses and to be blocked during each of said pulses in response to the voltage then present on said base electrode.

2. A tachometer in accordance with claim 3, in which said means for connecting said source of voltage comprises rectifier means for enabling calibration of said tachometer in response to an alternating voltage of known frequency.

3. A tachometer in accordance with claim 1, in which said charge-storage means comprises a plurality of capacitors and means for controlably connecting different numbers of said capacitors in parallel with each other between said emitter electrode and said reference-potential line.